J. ERMBTER.
NAPPING MACHINE.
APPLICATION FILED NOV. 2, 1909.
990,244.
Patented Apr. 25, 1911.
2 SHEETS—SHEET 1.
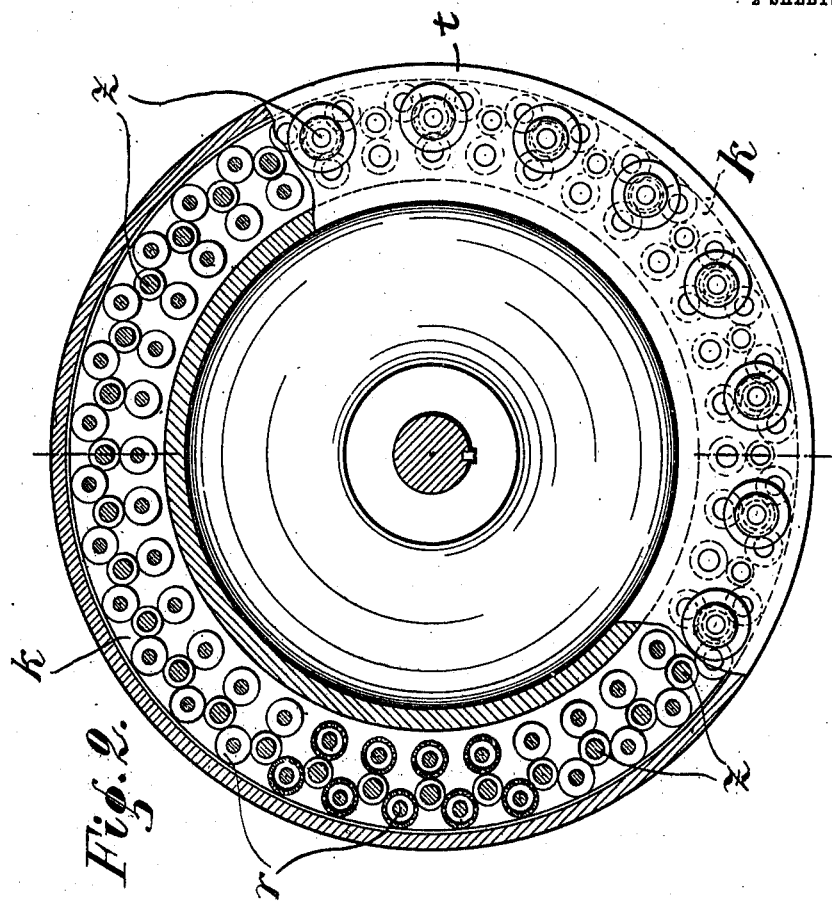
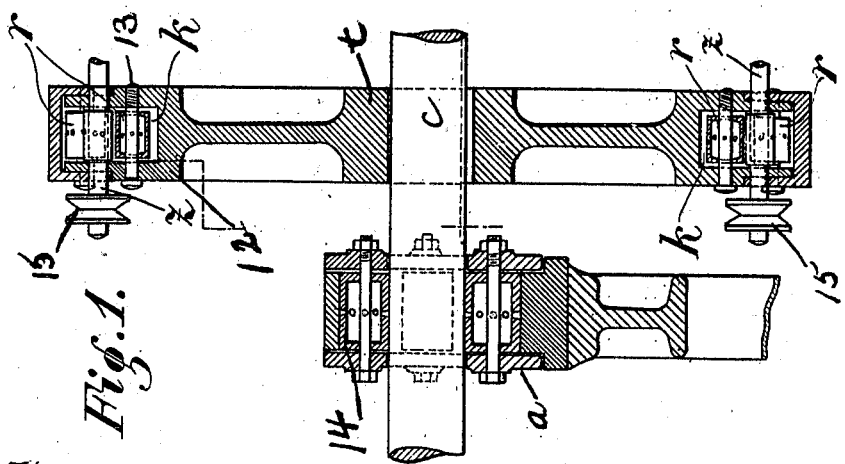

J. ERMBTER.
NAPPING MACHINE.
APPLICATION FILED NOV. 2, 1909.

990,244.

Patented Apr. 25, 1911.

2 SHEETS—SHEET 2.

UNITED STATES PATENT OFFICE.

JACOB ERMBTER, OF MÜNCHEN-GLADBACH, GERMANY, ASSIGNOR OF ONE-HALF TO THE FIRM OF C. ROESCH & CO., OF MÜLHEIM-ON-THE-RUHR, GERMANY.

NAPPING-MACHINE.

990,244. Specification of Letters Patent. Patented Apr. 25, 1911.

Application filed November 2, 1909. Serial No. 525,873.

*To all whom it may concern:*

Be it known that I, JACOB ERMBTER, a citizen of the German Empire, residing at München-Gladbach, Germany, have invented new and useful Improvements in Napping-Machines, of which the following is a specification.

This invention relates to a napping machine of novel construction and more particularly to improved means for journaling the napping cylinders to the supporting heads of a barrel gig. By my invention the friction on the cylinder shafts, which are subjected to severe strain, is reduced to a minimum, while, furthermore, means are provided for effectively lubricating said shafts.

Figure 3:
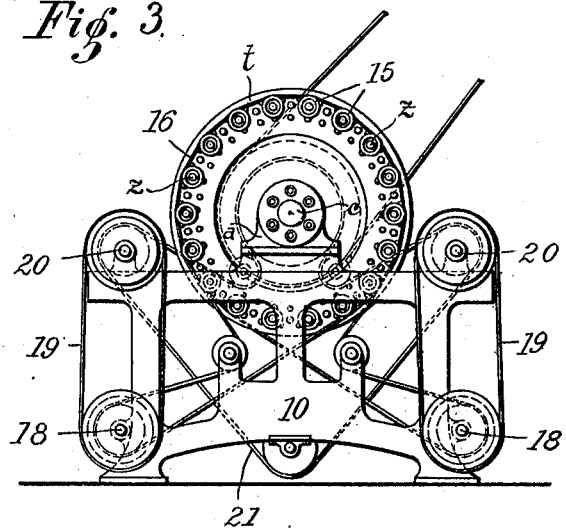
Figure 4:
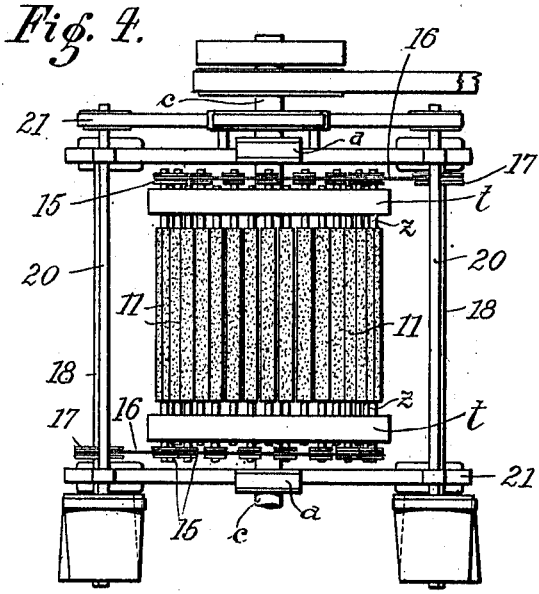

In the accompanying drawing: Figure 1 is a vertical cross section through one of the heads of the napping machine and adjoining parts; Fig. 2 a vertical longitudinal section thereof; Fig. 3 a side elevation of the napping machine, and Fig. 4 a plan thereof.

The power shaft $c$, of the napping machine is journaled in bearings $a$, mounted on the machine frame 10. Upon the shaft are fast a pair of circular heads $t$, adapted to support the journals $z$, of the napping cylinders 11 arranged in the shape of a drum between said heads. Each head $t$, is provided with a hollow rim forming an annular chamber $k$, through which journals $z$, extend, said chamber having a removable cover 12 connected to the head by bolts 13. Within chamber $k$, are journaled upon bolts 13, or otherwise, two circular concentric rows of friction rolls $r$, the rolls of the inner row being interpolated between those of the outer row. Each journal $z$, of the napping cylinders enters between the circumference of one of the inner rolls and the circumference of the two flanking outer rolls. In this way each journal is supported by a cluster of three rolls, so that upon a rotation of the napping cylinders, the rolls will also be rotated and thus assist in the rotation of the cylinders.

Chambers $k$, are filled with a suitable lubricant which may be introduced through the bolt holes and which is adapted to lubricate the cylinder shafts, as well as the friction rolls.

If desired, the axle bearing $a$, of shaft $c$, may be provided with a ball or roller race 14, and may be rotatably mounted on frame 10.

To drive napping cylinders 11, there are mounted on the protruding ends of shafts $z$, pulleys 15 engaged by ropes 16 that also engage pulleys 17 of shafts 18. The latter are driven by ropes 19 from shafts 20, which, in turn, receive motion from shaft $c$, by belts 21.

I claim:

1. A napping machine comprising a shaft, a pair of spaced heads carried thereby and provided with annular chambers, a circular row of napping cylinders between the heads, chain-driven spindles carrying said cylinders and extending into the chambers, an inner row of supporting rolls engaging the spindles and radially alined therewith, an outer row of transmission rolls, each transmission roll engaging two adjoining spindles, whereby a continuous train of spindles and transmission rolls is formed to insure uniformity of rotation of all of the napping cylinders.

2. A napping machine comprising a shaft, a pair of spaced heads carried thereby and having circumferentially grooved rims, covers for said rims to form annular chambers, two concentric rows of bolts traversing said with those of the other row, supporting rolls mounted on the bolts of the inner row, transmission rolls mounted on the bolts of the outer row, and a plurality of napping cylinders having spindles each spindle being engaged by one supporting roll and two adjoining transmission rolls.

JACOB ERMBTER.

Witnesses:
 HARRY EICKERSHOFF,
 ARUS VANDORY.

---

Copies of this patent may be obtained for five cents each, by addressing the "Commissioner of Patents, Washington, D. C."